United States Patent
Xu et al.

(10) Patent No.: US 12,441,943 B2
(45) Date of Patent: Oct. 14, 2025

(54) FLUIDIZED CATALYTIC CONVERSION METHOD FOR PREPARING LOW-CARBON OLEFINS

(71) Applicants: CHINA PETROLEUM & CHEMICAL CORPORATION, Beijing (CN); SINOPEC RESEARCH INSTITUTE OF PETROLEUM PROCESSING CO., LTD., Beijing (CN)

(72) Inventors: Youhao Xu, Beijing (CN); Yanfen Zuo, Beijing (CN); Xingtian Shu, Beijing (CN); Xieqing Wang, Beijing (CN); Yibin Luo, Beijing (CN); Yunpeng Zhang, Beijing (CN); Yueyang Han, Beijing (CN); Lingyin Du, Beijing (CN)

(73) Assignees: CHINA PETROLEUM & CHEMICAL CORPORATION, Beijing (CN); SINOPEC RESEARCH INSTITUTE OF PETROLEUM PROCESSING CO., LTD., Beijing (CN)

( * ) Notice: Subject to any disclaimer, the term of this patent is extended or adjusted under 35 U.S.C. 154(b) by 184 days.

(21) Appl. No.: 18/260,643

(22) PCT Filed: Jun. 24, 2021

(86) PCT No.: PCT/CN2021/101925
§ 371 (c)(1),
(2) Date: Jul. 7, 2023

(87) PCT Pub. No.: WO2022/147970
PCT Pub. Date: Jul. 14, 2022

(65) Prior Publication Data
US 2024/0067885 A1 Feb. 29, 2024

(30) Foreign Application Priority Data

Jan. 11, 2021 (CN) .......................... 202110031544.4
Jan. 11, 2021 (CN) .......................... 202110031545.9

(51) Int. Cl.
*C10G 11/05* (2006.01)
*C10G 11/18* (2006.01)

(52) U.S. Cl.
CPC ............ *C10G 11/182* (2013.01); *C10G 11/05* (2013.01); *C10G 2300/1088* (2013.01);
(Continued)

(58) Field of Classification Search
CPC ....... C10G 11/05; C10G 11/18; C10G 11/182; C10G 2300/1088; C10G 2300/4006;
(Continued)

(56) References Cited

U.S. PATENT DOCUMENTS

2004/0102667 A1  5/2004  Vora et al.
2009/0105512 A1  4/2009  Xie et al.

FOREIGN PATENT DOCUMENTS

CN    101092323 A    12/2007
CN    101239878 A    8/2008
(Continued)

OTHER PUBLICATIONS

CN-103121894-A (Year: 2013).*

*Primary Examiner* — Ellen M Mcavoy
*Assistant Examiner* — Chantel Graham
(74) *Attorney, Agent, or Firm* — NKL Law; Allen Xue

(57) ABSTRACT

A fluidized catalytic conversion method for producing light olefins includes the following steps: 1) introducing an olefin-rich feedstock into a fluidized catalytic conversion reactor, and contacting with a catalyst having a temperature of 650° C. or higher for reaction; 2) separating the reaction
(Continued)

product vapor obtained by the reaction to obtain a stream comprising C5+ olefins; and 3) recycling at least a part of the stream comprising C5+ olefins to step 1) for further reaction. The fluidized catalytic conversion method can effectively improve the yield of light olefins, improve the selectivity and improve the ethylene/propylene ratio of the product.

19 Claims, 3 Drawing Sheets

(52) U.S. Cl.
CPC ............... *C10G 2300/4006* (2013.01); *C10G 2300/4012* (2013.01); *C10G 2300/4081* (2013.01); *C10G 2300/701* (2013.01); *C10G 2400/20* (2013.01)

(58) Field of Classification Search
CPC .... C10G 2300/4012; C10G 2300/4081; C10G 2300/701; C10G 2400/20; C10G 51/026; C10G 9/36; C10G 2300/1081; C10G 2300/1096; C10G 55/00; Y02P 20/52; Y02P 30/40; Y02P 70/50; C07C 11/04; C07C 11/06; C07C 11/08; C07C 4/06; Y02E 60/10

See application file for complete search history.

(56) References Cited

FOREIGN PATENT DOCUMENTS

| | | | |
|---|---|---|---|
| CN | 101293800 A | | 10/2008 |
| CN | 101531558 A | | 9/2009 |
| CN | 101760228 A | | 6/2010 |
| CN | 103121894 A | * | 5/2013 |
| CN | 107434755 A | | 12/2017 |
| CN | 110437023 A | | 11/2019 |
| JP | H11263983 A | | 9/1999 |
| JP | 2004509928 A | | 4/2004 |
| JP | 2008081417 A | | 4/2008 |
| JP | 2009505983 A | | 2/2009 |
| WO | 2013121433 A1 | | 8/2013 |
| WO | 2020192490 A1 | | 10/2020 |

* cited by examiner

FLUIDIZED CATALYTIC CONVERSION METHOD FOR PREPARING LOW-CARBON OLEFINS

CROSS REFERENCE TO RELATED APPLICATIONS

This application is a U.S. national stage entry of PCT International Application No. PCT/CN2021/101925, filed on Jun. 24, 2021, which claims priority from a Chinese patent application No. 202110031544.4, titled "a catalytic conversion method for preparing ethylene, propylene and butylene", filed on Jan. 11, 2021 and a Chinese patent application No. 202110031545.9, titled "a catalytic conversion method for preparing ethylene and propylene", filed on Jan. 11, 2021, the contents of which are incorporated herein by reference in its entirety.

TECHNICAL FIELD

The present application relates to the technical field of fluidized catalytic conversion, particularly to a fluidized catalytic conversion method for preparing low-carbon olefins (also referred to as light olefins).

BACKGROUND ART

Propylene and ethylene are two most important basic raw materials for modern petrochemical industry, but with the increasing production of oil fields, the available yield of conventional crude oil is gradually reduced, the quality of crude oil is becoming deteriorated and heavy, and although the production capacity of light olefins is rapidly increased at present, the demand of light olefins in the market still cannot be met.

Ethylene and propylene are increasingly demanded as important chemical intermediates, and are mainly used for producing various important organic chemical raw materials, synthetic resins, synthetic rubbers, various fine chemicals and the like. Ethylene is one of the chemical products with the largest yield in the world, and accounts for more than 75% of the whole petrochemical product yield in the world; the bulk downstream products of ethylene mainly include polyethylene, ethylene oxide, ethylene glycol, polyvinyl chloride, styrene, vinyl acetate and the like. Propylene is an important organic chemical raw material, and is mainly used for preparing acrylonitrile, propylene oxide, acetone and the like.

The traditional route for preparing ethylene and propylene by steam cracking has a large demand for light hydrocarbons such as naphtha and the like, the steam cracking raw materials mainly include light hydrocarbons (such as ethane, propane and butane), naphtha, diesel oil, condensate oil and hydrogenated tail oil, among which the mass fraction of the naphtha accounts for more than 50%, typical naphtha steam cracking has an ethylene yield of about 29-34%, a propylene yield of 13-16%, and the lower ethylene/propylene output ratio is difficult to meet the current situation of light olefin demand.

Chinese patent application No. CN101092323A discloses a method for preparing ethylene and propylene from a mixture of C4-C8 olefins, comprising reacting the mixture at a reaction temperature of 400-600° C. and an absolute pressure of 0.02-0.3 MPa, and recycling 30-90 wt % of a C4 fraction to the reactor after separating in a separator for further cracking. The method improves the conversion rate of olefin mainly by recycling the C4 fraction, the ethylene and propylene obtained account for not less than 62% of the total amount of the olefin feedstock, but it suffers from the problems including a relatively low ethylene/propylene ratio, which cannot be flexibly adjusted according to market demands, low reaction selectivity, high butylene content in the product, and energy consumption for C4 separation.

Chinese patent application No. CN101239878A discloses a method using a mixture rich in C4+ olefins a raw material, comprising reacting at a reaction temperature of 400-680° C., a reaction pressure of −0.09 MPa to 1.0 MPa and a weight space velocity of 0.1-50 h$^{-1}$, the resulting product has an ethylene/propylene ratio of lower than 0.41, and as the temperature rises, the ethylene/propylene ratio increases, and the production of hydrogen, methane and ethane increases.

Meanwhile, the olefin production route also includes a non-petroleum route, that is a process for producing light olefins mainly comprising ethylene and propylene by using oxygen-containing organic compounds, typically methanol or dimethyl ether, as raw materials, which is called MTO for short. Methanol or dimethyl ether is a typical oxygen-containing organic compound, the reaction for producing light olefins from which has the characteristics of rapid reaction, strong heat release, low catalyst-to-alcohol ratio and long reaction induction period, and rapid deactivation of catalyst is a major challenge of the MTO process. How to solve the problems of long reaction induction period, easy deactivation of catalyst and the like in the MTO process in a scientific and efficient way is a subject always lies ahead the majority of scientific researchers and engineers.

Therefore, there is a need in the art for a novel fluidized catalytic conversion method that produces ethylene and propylene in high yield and achieves efficient utilization of resources.

SUMMARY OF THE INVENTION

An object of the present application is to provide a fluidized catalytic conversion method for preparing light olefins (such as ethylene, propylene and butylene), which can simultaneously improve the yield and selectivity of light olefins and increase the ethylene/propylene ratio of the product.

To achieve the above object, the present application provides a fluidized catalytic conversion method for producing light olefins, comprising the steps of:
1) introducing an olefin-rich feedstock into a fluidized catalytic conversion reactor, contacting with a catalytic conversion catalyst having a temperature of 650° C. or higher, and reacting under first catalytic conversion conditions, wherein the olefin-rich feedstock has an olefin content of 50 wt % or more;
2) separating the effluent of the fluidized catalytic conversion reactor to obtain reaction product vapor and a spent catalyst, and separating the reaction product vapor to obtain ethylene, propylene, butylene and a stream comprising C5+ olefins; and
3) recycling at least a part of the stream comprising C5+ olefins to step 1) for further reaction,
wherein the first catalytic conversion conditions include:
a reaction temperature of 600-800° C., preferably 630-780° C.;
a reaction pressure of 0.05-1 MPa, preferably 0.1-0.8 MPa;
a reaction time of 0.01 to 100 seconds, preferably 0.1 to 80 seconds;

a weight ratio of the catalytic conversion catalyst to the olefin-rich feedstock of (1-200):1, preferably (3-180):1.

Preferably, the method further comprises the steps of:

4) recycling at least a part of the butylene separated in step 2) to the catalytic conversion reactor upstream of the position at which the olefin-rich feedstock is introduced to contact with the catalytic conversion catalyst and react under second catalytic conversion conditions including:

a reaction temperature of 650-800° C., preferably 680-780° C.;

a reaction pressure of 0.05-1 MPa, preferably 0.1-0.8 MPa;

a reaction time of 0.01 to 10 seconds, preferably 0.05 to 8 seconds;

a weight ratio of the catalytic conversion catalyst to the butylene of (20-200):1, preferably (30-180):1.

Preferably, the method further comprises the steps of:

1a) introducing an oxygen-containing organic compound into the catalytic conversion reactor downstream of the position at which the olefin-rich feedstock is introduced to contact with the catalytic conversion catalyst after the reaction of step 1) and react under third catalytic conversion conditions including:

a reaction temperature of 300-550° C., preferably 400-530° C.;

a reaction pressure of 0.01 to 1 MPa, preferably 0.05 to 1 MPa;

a reaction time of 0.01 to 100 seconds, preferably 0.1 to 80 seconds;

a weight ratio of the catalytic conversion catalyst to the oxygen-containing organic compound of (1-100):1, preferably (3-50):1, In the method of the present application, the olefin-rich feedstock is subjected to cracking reaction on a catalyst having a high temperature (≥650° C.), and then the olefin-containing stream obtained by separating the product is introduced into the reactor again for further reaction, so that the yield of light olefins can be effectively increased, the selectivity can be improved, and the ethylene/propylene ratio of the product can be improved; and at the same time the generation of hydrogen, methane and ethane can be reduced, and especially the generation of methane can be inhibited. In addition, the further reaction of the olefin in the separated product can further improve the utilization rate of petroleum resources.

Other characteristics and advantages of the present application will be described in detail in the detailed description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

Figure 1:
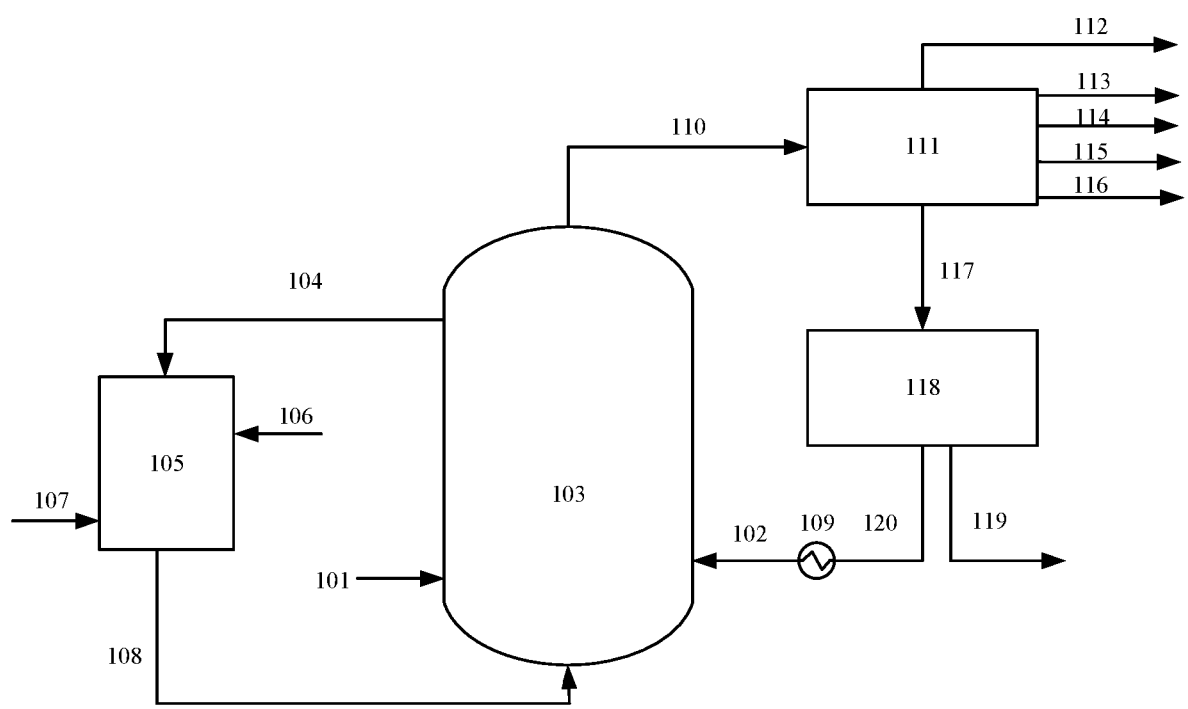
FIG. 1 shows a schematic flow diagram of a preferred embodiment of the method of the present application.

| Brief description of the reference numerals | | |
|---|---|---|
| 101 pipeline | 102 pipeline | 103 catalytic conversion reactor |
| 104 pipeline | 105 regenerator | 106 pipeline |
| 107 pipeline | 108 pipeline | 109 heat exchanger |
| 110 transfer line | 111 product fractionator | 112 pipeline |
| 113 pipeline | 114 pipeline | 115 pipeline |
| 116 pipeline | 117 pipeline | 118 olefin separator |
| 119 pipeline | 120 pipeline | |
| 201 pipeline | 202 catalytic conversion reactor | 203 pipeline |
| 204 pipeline | 205 heat exchanger | 206 heat exchanger |
| 207 outlet section | 208 cyclone separator | 209 plenum chamber |
| 210 stripping section | 211 pipeline | 212 standpipe |
| 213 regenerator | 214 pipeline | 215 pipeline |
| 216 pipeline | 217 pipeline | 218 pipeline |
| 219 reactor vapor line | 220 fractionator | 221 pipeline |
| 222 pipeline | 223 pipeline | 224 pipeline |
| 225 pipeline | 226 pipeline | 227 pipeline |
| 228 olefin separator | | |
| 301 pipeline | 302 catalytic conversion reactor | 303 pipeline |
| 304 pipeline | 305 heat exchanger | 306 heat exchanger |
| 307 outlet section | 308 cyclone separator | 309 plenum chamber |
| 310 stripping section | 311 pipeline | 312 standpipe |
| 313 regenerator | 314 pipeline | 315 pipeline |
| 316 pipeline | 317 pipeline | 318 pipeline |
| 319 reactor vapor line | 320 fractionator | 321 pipeline |
| 322 pipeline | 323 pipeline | 324 pipeline |
| 325 pipeline | 326 pipeline | 327 pipeline |
| 328 olefin separator | 329 pipeline | |

DETAILED DESCRIPTION OF THE INVENTION

The present application will be further described hereinafter in detail with reference to the drawing and specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the context of the present application, the expression "C5+" means having at least 5 carbon atoms, for example the term "C5+ olefins" refers to olefins having at least 5 carbon atoms, while the term "C5+ fraction" refers to a fraction of which the compounds have at least carbon atoms.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

The inventors of the present application, after studying the differences in the distribution of products formed by catalytic cracking of alkanes and olefins, have surprisingly found that: the effect on the production of light olefins through catalytic cracking of olefins is obviously superior to that of alkanes, the catalytic cracking of olefins under high-temperature catalytic reaction conditions can not only improve the yield and selectivity of ethylene, propylene and butylene simultaneously, but also significantly reduce the generation of byproducts such as methane and the like, and improve the cracking effect and the utilization rate of resources, thereby arriving at the technical solution of the present application.

As previously mentioned, the present application provides a fluidized catalytic conversion method for producing light olefins, comprising the steps of:
1) introducing an olefin-rich feedstock into a fluidized catalytic conversion reactor, and contacting with a catalytic conversion catalyst having a temperature of 650° C. or higher for reaction, wherein the olefin-rich feedstock has an olefin content of 50 wt % or more;
2) separating the effluent of the fluidized catalytic conversion reactor to obtain reaction product vapor and a spent catalyst, and separating the reaction product vapor to obtain ethylene, propylene, butylene and a stream comprising C5+ olefins; and
3) recycling at least a part of the stream comprising C5+ olefins to step 1) for further reaction.

In the method of the present application, an olefin-rich material is used as the feedstock, which is subjected to cracking reaction on a catalyst having a high temperature (≥650° C.), and then the olefin-containing stream obtained by separating the product is introduced into the fluidized catalytic conversion reactor again for further reaction, so that the yield of light olefins can be effectively increased, the selectivity can be improved, and the ethylene/propylene ratio of the product can be improved; and at the same time the generation of hydrogen, methane and ethane can be reduced, and especially the generation of methane can be inhibited. In addition, the further reaction of the olefin-containing stream rich in olefins in the cracked product can further improve the utilization rate of petroleum resources.

In a preferred embodiment, the reaction of step 1) is carried out under first catalytic conversion conditions including: a reaction temperature of 600-800° C.; a reaction pressure of 0.05-1 MPa; a reaction time of 0.01-100 seconds; and a weight ratio of the catalytic conversion catalyst to the olefin-rich feedstock of (1-200):1.

In a further preferred embodiment, the first catalytic conversion conditions include: a reaction temperature of 630-780° C.; a reaction pressure of 0.1-0.8 MPa; a reaction time of 0.1-80 seconds; and a weight ratio of the catalytic conversion catalyst to the olefin-rich feedstock of (3-180):1.

In a particularly preferred embodiment, the first catalytic conversion conditions include: a reaction temperature of 650-780° C.; a reaction pressure of 0.1-0.7 MPa; a reaction time of 0.1-20 seconds; and a weight ratio of the catalytic conversion catalyst to the olefin-rich feedstock of (3-150):1.

In a preferred embodiment, the olefin-rich feedstock used in step 1) is a feedstock having an olefin content of 80 wt % or more, preferably 90 wt % or more, more preferably a pure olefin feedstock. According to the present application, the higher the olefin content in the olefin-rich feedstock used, the higher the yields of ethylene, propylene and butylene obtained by the catalytic conversion reaction and the further inhibition of the production of hydrogen, methane and ethane in the product.

In a preferred embodiment, the olefins in the olefin-rich feedstock consist essentially of C5+ olefins, e.g. 80% or more, 85% or more, 90% or more, or 95% or more of the olefins, more preferably 100% of the olefins, in the olefin-rich feedstock are C5+ olefins.

In some embodiments, the olefin-rich feedstock used in step 1) may be derived from any one or more of the following sources: a C5+ fraction produced by an alkane dehydrogenation unit, a C5+ fraction produced by a catalytic cracking unit in an oil refinery, a C5+ fraction produced by a steam cracking unit in an ethylene plant, an olefin-rich C5+ fraction produced by MTO (methanol-to-olefin) process, and an olefin-rich C5+ byproduct fraction of MTP (methanol-to-propylene) process. In a preferred embodiment, the alkane feedstock for the alkane dehydrogenation unit can be derived from at least one of naphtha, aromatic raffinate, and other light hydrocarbons. In actual production, the alkane product from other petrochemical plants can be used.

In some embodiments, the olefin-rich feedstock used herein is obtainable by contacting an alkane with a dehydrogenation catalyst in a dehydrogenation reactor under catalytic dehydrogenation conditions, wherein the dehydrogenation conditions used include: an inlet temperature of the dehydrogenation reactor of 400-700° C., a volume space velocity of alkane of 200-5000 $h^{-1}$ and a reaction pressure of 0-0.1 MPa.

Preferably, the dehydrogenation catalyst consists of a carrier and an active component and a promoter that are supported on the carrier; based on the total weight of the dehydrogenation catalyst, the carrier is present in an amount of 60-90 wt %, the active component is present in an amount of 8-35 wt %, and the promoter is present in an amount of 0.1-5 wt %.

Further preferably, the carrier may be an alumina comprising a modifier, wherein the modifier may be present in an amount of 0.1 to 2 wt %, based on the total weight of the dehydrogenation catalyst, and may be La and/or Ce; the active component may be platinum and/or chromium; the promoter may be a composition of bismuth and an alkali metal component or a composition of bismuth and an alkaline earth metal component, wherein the molar ratio of bismuth to the active component is 1:(5-50), and the molar ratio of bismuth to the alkali metal component is 1:(0.1-5), the molar ratio of bismuth to the alkaline earth metal component is 1:(0.1-5). Particularly preferably, the alkali metal component may be one or more selected from of Li, Na and K; the alkaline earth metal component may be one or more selected from of Mg, Ca and Ba.

In a preferred embodiment, the stream comprising C5+ olefins separated in step 2) has an olefin content of 50 wt % or more, for example a C5+ olefin content of 50 wt % or higher, the higher the olefin content in the stream comprising C5+ olefins, the better the effect of recycling and the better the utilization of resources.

According to the present application, in step 2) the reaction product vapor may be separated by separation device commonly used in the art, such as a product fractionator. In a preferred embodiment, the reaction product vapor may be separated by a separation system comprising a product fractionator and an olefin separator. In a further preferred embodiment, the reaction product vapor is first sent to a product fractionator to separate into ethylene, propylene, butylene and an olefin-containing stream (for example, a fraction with a boiling point of 20° C. or higher), and then the olefin-containing stream is sent to an olefin separator to further separate into the stream comprising C5+ olefins, so as to further increase the olefin content thereof.

In a particularly preferred embodiment, said step 2) further comprises:
  2a) separating the effluent of the fluidized catalytic conversion reactor to obtain reaction product vapor and the spent catalyst,
  2b) separating the reaction product vapor in a product fractionator to obtain ethylene, propylene, butylene and a first olefin-containing stream; and
  2c) separating said first olefin-containing stream in an olefin separator to obtain a second olefin-containing stream rich in olefins, wherein the olefin content of said second olefin-containing stream is greater than the olefin content of said first olefin-containing stream, and recycling said second olefin-containing stream to step 1) as said stream comprising C5+ olefins for further reaction. The separation system used in this embodiment can greatly improve the olefin content in the stream comprising C5+ olefins, which is returned to the fluidized catalytic conversion reactor for further reaction, and reduce the influence of other impurities.

According to the present application, the fluidized catalytic conversion reactor may comprise one reactor or a plurality of reactors connected in series and/or parallel.

According to the present application, the fluidized catalytic conversion reactor may be selected from a riser reactor, a fluidized bed reactor, an ascending transfer line, a descending transfer line, or a combination of two or more thereof, wherein the riser reactor may be an equal-diameter riser reactor or a diameter-transformed riser reactor, the fluidized bed reactor may be a constant-linear-velocity fluidized bed reactor or an equal-diameter fluidized bed reactor, and the diameter-transformed riser reactor may be a riser reactor as described in, for example, Chinese patent No. CN 1078094C.

In some preferred embodiments, the fluidized catalytic conversion reactor is a fluidized bed reactor, and the stream comprising C5+ olefins separated in step 2) may be recycled to the bottom of the fluidized bed reactor for further reaction. In other preferred embodiments, the fluidized catalytic conversion reactor is a riser reactor, and the butylene and the stream comprising C5+ olefins separated in step 2) may be recycled to the riser reactor for further reaction.

In a preferred embodiment, the fluidized catalytic conversion method of the present application further comprises the steps of:
  4) recycling at least a part of the butylene separated in step 2) to the catalytic conversion reactor upstream of the position at which the olefin-rich feedstock is introduced to contact with the catalytic conversion catalyst and react under second catalytic conversion conditions including: a reaction temperature of 650-800° C., a reaction pressure of 0.05-1 MPa, a reaction time of 0.01-10 seconds, and a weight ratio of the catalytic conversion catalyst to the butylene of (20-200):1;
  further preferably, the second catalytic conversion conditions include: a reaction temperature of 680-780° C., a reaction pressure of 0.1-0.8 MPa, a reaction time of 0.05-8 seconds, and a weight ratio of the catalytic conversion catalyst to the butylene of (30-180):1.

In some preferred embodiments, the fluidized catalytic conversion method of the present application further comprises the steps of:
  1a) introducing an oxygen-containing organic compound into the catalytic conversion reactor downstream of the position at which the olefin-rich feedstock is introduced to contact with the catalytic conversion catalyst after the reaction of step 1) and react under third catalytic conversion conditions including: a reaction temperature of 300-550° C., a reaction pressure of 0.01-1 MPa, a reaction time of 0.01-100 seconds, and a weight ratio of the catalytic conversion catalyst to the oxygen-containing organic compound feedstock of (1-100):1;
  further preferably, the third catalytic conversion conditions include: a reaction temperature of 400-530° C., a reaction pressure of 0.05-1 MPa, a reaction time of 0.1-80 seconds, and a weight ratio of the catalytic conversion catalyst to the oxygen-containing organic compound feedstock of (3-50):1.

Particularly preferably, the oxygen-containing organic compound comprises at least one of methanol, ethanol, dimethyl ether, methyl ethyl ether and ethyl ether. For example, the oxygen-containing organic compound, such as methanol or dimethyl ether, may be derived from coal-based or natural gas-based synthesis gas.

In a preferred embodiment, the catalytic conversion catalyst employed herein may comprise a molecular sieve, an inorganic oxide, and optionally a clay, wherein the catalytic conversion catalyst comprises from 1 to 50 wt % of the molecular sieve, from 5 to 99 wt % of the inorganic oxide, and from 0 to 70 wt % of the clay, based on the weight of the catalyst.

In a further preferred embodiment, in the catalytic conversion catalyst, the molecular sieve serves as an active component, which may be selected from mesoporous molecular sieves and/or microporous molecular sieves; the molecular sieve may comprise 50 to 100 wt % of a mesoporous molecular sieve and 0 to 50 wt % of a microporous molecular sieve, based on the total weight of the molecular sieve. It is particularly preferred that the molecular sieve is free of macroporous molecular sieve (e.g., a Y-type molecular sieve).

In some still further preferred embodiments, the mesoporous molecular sieve may be a ZSM molecular sieve, for example, the ZSM molecular sieve may be one or more selected from the group consisting of ZSM-5, ZSM-11, ZSM-12, ZSM-23, ZSM-35, AND ZSM-48; the microporous molecular sieve may be SAPO molecular sieve and/or SSZ molecular sieve, for example, the SAPO molecular sieve may be one or more selected from the group consisting of SAPO-34, SAPO-11 and SAPO-47, and the SSZ molecular sieve may be one or more selected from the group consisting of SSZ-13, SSZ-39 and SSZ-62.

In a further preferred embodiment, in the catalytic conversion catalyst, the inorganic oxide serves as a binder, and preferably, the inorganic oxide may be selected from silicon dioxide ($SiO_2$) and/or aluminum oxide ($Al_2O_3$).

In a further preferred embodiment, in the catalytic conversion catalyst, the clay serves as a matrix, preferably the clay may be selected from kaolin and/or halloysite.

In a further preferred embodiment, the catalytic conversion catalyst employed herein may also be loaded with a modifying element. For example, the catalytic conversion catalyst may comprise 0.1 to 3 wt % of the modifying element, based on the weight of the catalyst; the modifying element may be one or more selected from Group VIII metals, Group IVA metals, Group VA metals and rare earth metals. In a further preferred embodiment, the modifying element may be one or more selected from phosphorus, iron, cobalt and nickel.

In some preferred embodiments, the fluidized catalytic conversion method of the present application further comprises the steps of:

5) regenerating the spent catalyst obtained by the separation in step 2) by coke burning to obtain a regenerated catalyst, adjusting the temperature of the regenerated catalyst to be 650° C. or higher, and then recycling the regenerated catalyst to the fluidized catalytic conversion reactor to be used as the catalytic conversion catalyst.

In this embodiment, the deactivated spent catalyst is regenerated by coke burning, so that the catalyst may be recycled, and the utilization rate of the catalyst is improved; and the regenerated catalyst is subjected to temperature adjustment, such as preheated to 650° C. or higher, and then recycled to the reactor, so that the catalytic effect of the catalyst may be improved.

As is well known to those skilled in the art, the thermal energy for preheating the regenerated catalyst may be provided electrically or by combustion of byproduct gases of the method of the present application, inferior heavy oils, fuel oils and fuel gases from other units of a refinery, and the like.

In a preferred embodiment, as shown in FIG. 1, the fluidized catalytic conversion method for producing light olefins of the present application is carried out as follows:

an olefin-rich feedstock having an olefin content of 50 wt % or higher and a pre-lifting medium are introduced via pipeline 101 into the bottom of a fluidized catalytic conversion reactor (a fluidized bed reactor) 103, contacted and reacted with a regenerated catalytic conversion catalyst introduced via pipeline 108, and move upward in the fluidized catalytic conversion reactor 103 under the action of the pre-lifting medium.

a spent catalyst generated in the reaction is withdrawn from the top of the fluidized catalytic conversion reactor 103, and passed to a regenerator 105 through an outlet pipeline 104, and main air is introduced into the regenerator 105 through pipeline 106 to burn out the coke on the spent catalyst and regenerate the spent catalyst; a make-up fuel is introduced into the regenerator 5 through pipeline 107 for combustion, and the regenerated catalyst is preheated to 650° C. or higher; the preheated regenerated catalyst is introduced into the bottom of the fluidized catalytic conversion reactor 103 via pipeline 108.

Reaction product vapor generated in the reaction is withdrawn from the top of the fluidized catalytic conversion reactor 103, passed to a subsequent product fractionator 111 through pipeline 110 for product separation, the separated hydrogen, methane and ethane are withdrawn through pipeline 112, ethylene is withdrawn through pipeline 113, propylene is withdrawn through pipeline 114, propane and butane are withdrawn through pipeline 115, butylene is withdrawn through pipeline 116, and the stream comprising residual olefins (the fraction with a boiling point of 20° C. or higher in the product) is passed into an olefin separator 118 through pipeline 117; the olefin-depleted stream (mainly comprising alkanes, a small amount of aromatic hydrocarbons, naphthenes and the like) obtained by separation is withdrawn from pipeline 119, the separated stream comprising C5+ olefins and having an olefin content of 50% or more is passed into a heat exchanger 109 through pipeline 120 to be preheated to 650° C. or higher, and then is sent to the bottom of the fluidized catalytic conversion reactor 103 through pipeline 102 for further reaction with the regenerated catalytic conversion catalyst.

Figure 2:
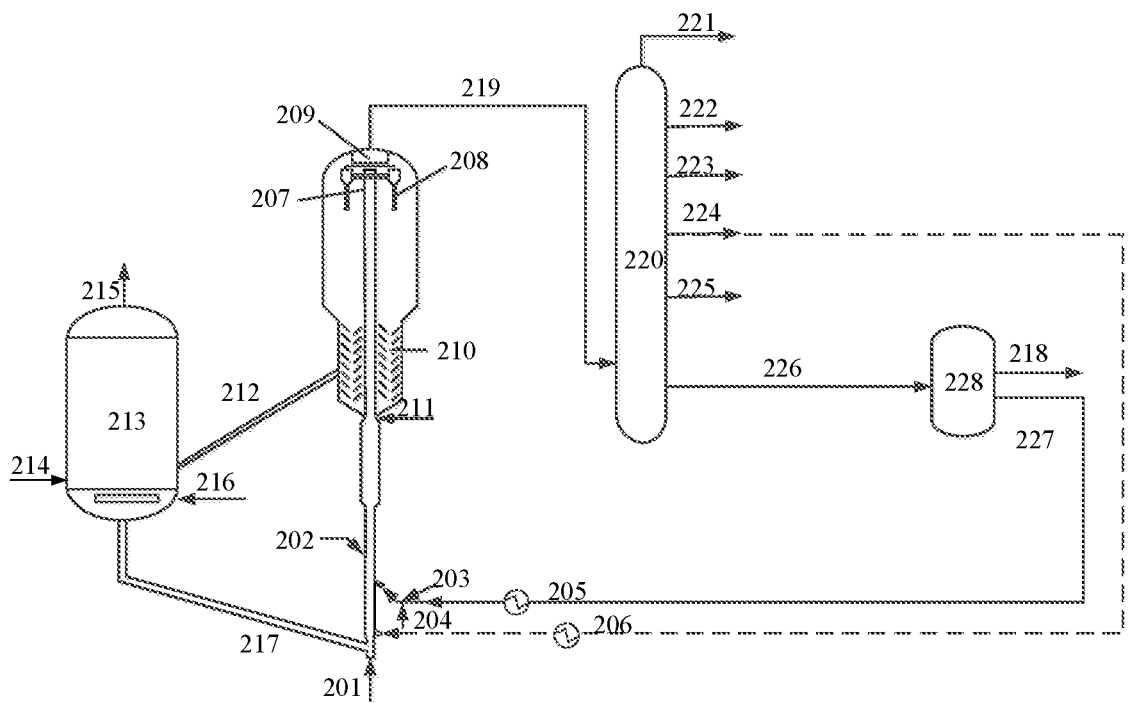
FIG. 2 shows a schematic flow diagram of another preferred embodiment of the method of the present application.

In another preferred embodiment, as shown in FIG. 2, the fluidized catalytic conversion method for producing light olefins of the present application is carried out as follows:

a pre-lifting medium is introduced from the bottom of a fluidized catalytic conversion reactor (a diameter-transformed riser reactor) 202 via pipeline 201, a regenerated fluidized catalytic conversion catalyst from pipeline 217 moves upward along the fluidized catalytic conversion reactor 202 under the lifting action of the pre-lifting medium, and an olefin-rich feedstock is injected into the bottom of the fluidized catalytic conversion reactor 202 via pipeline 203 along with atomized steam from pipeline 204, contacted with the hot catalytic conversion catalyst for reaction, and moves upward. The reaction product vapor and spent catalyst generated are passed to a cyclone separator 208 in the disengager through an outlet section 207 to conduct a separation of the spent catalyst and the reaction product vapor, the reaction product vapor is passed to a plenum chamber 209, and fine powder of the spent catalyst is returned to the disengager through a dipleg. Spent catalyst in the disengager is passed to a stripping section 210 where it is contacted with stripping steam from pipeline 211. The product vapor stripped from the spent catalyst is sent to the plenum chamber 209 after passing through the cyclone separator. The stripped spent catalyst is passed to a regenerator 213 through a standpipe 212, main air is introduced into the regenerator through pipeline 216 to burn out the coke on the spent catalyst so as to regenerate the inactivated spent catalyst, and make-up fuel is introduced into the regenerator through pipeline 214 for combustion, so that the regenerated catalyst is preheated to 650° C. or higher. The flue gas is passed to a flue gas turbine via pipeline 215 and the preheated regenerated catalyst is passed to the fluidized catalytic conversion reactor 202 via pipeline 217. The reaction product vapor is passed to a subsequent fractionator 220 through a reactor vapor line 219, the separated hydrogen, methane and ethane are withdrawn through pipeline 221, ethylene is withdrawn through pipeline 222, propylene is withdrawn through pipeline 223, butylene is withdrawn through pipeline 224, optionally passed into a heat exchanger 206 for preheating, and then recycled to the fluidized catalytic conversion reactor 202 at the upstream of the feeding position of the olefin-rich feedstock for further reaction, propane and butane are withdrawn through pipeline 225, a stream comprising residual olefins is passed into an olefin separator 228 through pipeline 226, the olefin-depleted stream obtained by separation is withdrawn through pipeline 218, the separated stream comprising C5+ olefins and having an olefin content of 50% or more is passed into a heat exchanger 205 through pipeline 227 for preheating, and then is passed to the fluidized catalytic conversion reactor 202 together with the olefin-rich feedstock from pipeline 203 for further reaction.

Figure 3:
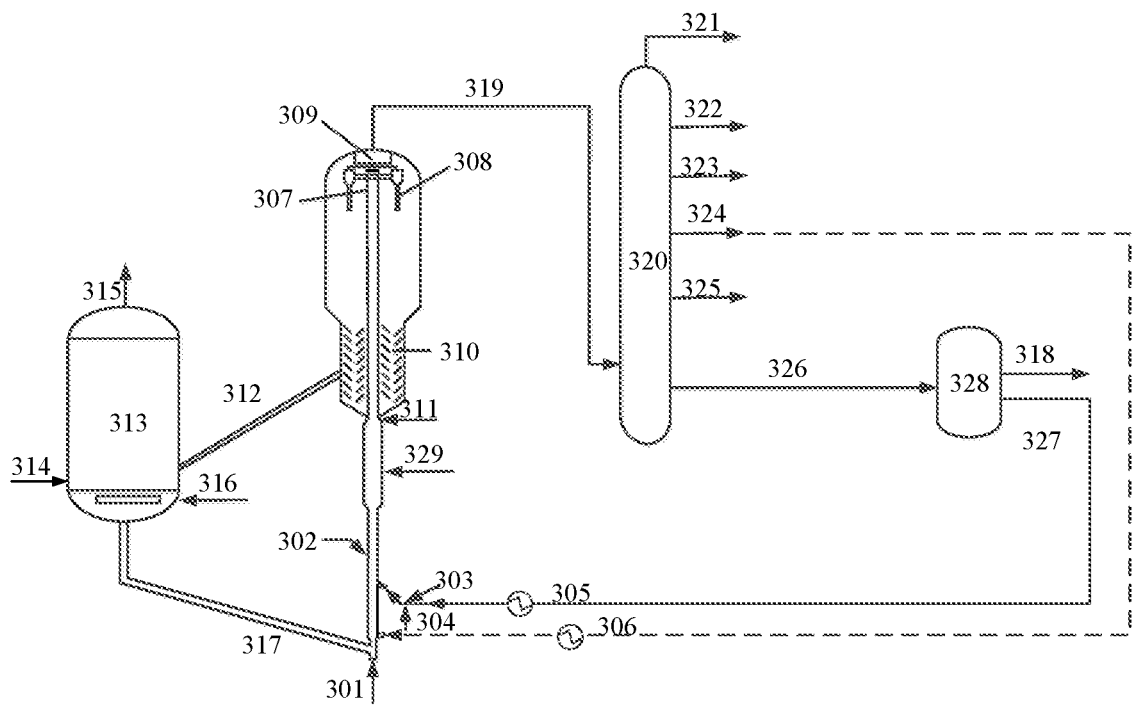
FIG. 3 shows a schematic flow diagram of another preferred embodiment of the method of the present application.

In another preferred embodiment, as shown in FIG. 3, the fluidized catalytic conversion method for producing light olefins of the present application is carried out as follows:

a pre-lifting medium is introduced from the bottom of a fluidized catalytic conversion reactor (a diameter-transformed riser reactor) 302 via pipeline 301, a regenerated fluidized catalytic conversion catalyst from pipeline 317 moves upward along the fluidized catalytic conversion reactor 302 under the lifting action of the pre-lifting medium, and the olefin-rich feedstock is injected into the bottom of the fluidized catalytic conversion reactor 302 via pipeline 303 along with atomized steam from pipeline 304 to contact with the hot catalytic conversion catalyst for reaction. Methanol feed is introduced via pipeline 329, mixed with the material in reactor 302, contacted with the catalytic conversion catalyst for reaction and moves upward. The reaction product vapor and spent catalyst generated are passed to a cyclone separator 308 in the disengager through an outlet section 307 to conduct a separation of the spent catalyst and the reaction product vapor, the reaction product vapor is passed to a plenum chamber 309, and fine powder of the spent catalyst is returned to the disengager through a dipleg. Spent catalyst in the disengager is passed to a stripping section 310 where it is contacted with stripping steam from pipeline 311. The product vapor stripped from the spent catalyst is passed to the plenum chamber 309 after passing through a cyclone separator. The stripped spent catalyst is passed to a regenerator 313 through a standpipe 312, main air is introduced into the regenerator through pipeline 316 to burn out the coke on the spent catalyst so as to regenerate the inactivated spent catalyst, and make-up fuel is introduced into the regenerator through pipeline 314 for combustion, so that the regenerated catalyst is preheated to 650° C. or higher. The flue gas is passed to a flue gas turbine via pipeline 315 and the preheated regenerated catalyst is passed to the fluidized catalytic conversion reactor 302 via pipeline 317. The reaction product vapor is passed to a subsequent fractionator 320 through a reactor vapor line 319, the separated hydrogen, methane and ethane are withdrawn through pipeline 321, ethylene is withdrawn through pipeline 322, propylene is withdrawn through pipeline 323, butylene is withdrawn through pipeline 324, optionally passed into a heat exchanger 306 for preheating, and then recycled to the fluidized catalytic conversion reactor 302 at the upstream of the feeding position of the olefin-rich feedstock for further reaction, propane and butane are withdrawn through pipeline 325, a stream comprising residual olefins is passed into an olefin separator 328 through pipeline 326, the olefin-depleted stream obtained by separation is withdrawn through pipeline 318, the separated stream comprising C5+ olefins and having an olefin content of 50% or more is passed into a heat exchanger 305 through pipeline 327 for preheating, and then is passed to the fluidized catalytic conversion reactor 302 together with the olefin-rich feedstock from pipeline 303 for further reaction.

In a particularly preferred embodiment, the present application provides the following technical solutions:

1. A catalytic conversion method for producing ethylene, propylene and butylene, comprising the steps of:

contacting an olefin-rich feedstock with a catalytic conversion catalyst having a temperature of 650° C. or higher in a catalytic conversion reactor under catalytic conversion conditions, to obtain reaction product vapor and a spent catalyst; the olefin-rich feedstock having an olefin content of 50 wt % or higher;

separating the reaction product vapor into ethylene, propylene, butylene and an olefin-containing stream in a separation system, and recycling the olefin-containing stream to the catalytic conversion reactor for further reaction.

2. The method according to Item 1, wherein the olefin-rich feedstock has an olefin content of 80 wt % or more, preferably 90 wt % or more, more preferably is a pure olefin feedstock.

3. The method according to Item 1 or 2, wherein the olefin in the olefin-rich feedstock is selected from C5+ olefins;

optionally, the olefin-rich feedstock is one or more of a C5+ fraction produced by an alkane dehydrogenation unit, a C5+ fraction produced by a catalytic cracking unit in an oil refinery, a C5+ fraction produced by a steam cracking unit in an ethylene plant, an olefin-rich C5+ byproduct fraction of an MTO process, and an olefin-rich C5+ byproduct fraction of an MTP process;

optionally, the alkane feedstock of the alkane dehydrogenation unit is one or more of naphtha, aromatic raffinate and light hydrocarbon.

4. The method according to Item 1, wherein the catalytic conversion reactor is one selected from the group consisting of a riser reactor, a constant-linear-velocity fluidized bed, an equal-diameter fluidized bed, an ascending transfer line, and a descending transfer line, or a combined reactor of two of them connected in series, wherein the riser reactor is an equal-diameter riser reactor or a diameter-transformed fluidized bed reactor.

5. The method according to Item 1, wherein the catalytic conversion conditions include:

a reaction temperature of 600-750° C., preferably 630-750° C. and more preferably 630-720° C.;

a reaction pressure of 0.05 to 1 MPa, preferably 0.1 to 0.8 MPa, and more preferably 0.2 to 0.5 MPa;

a reaction time of 0.01 to 100 seconds, preferably 0.1 to 80 seconds, more preferably 0.2 to 70 seconds;

a weight ratio of the catalytic conversion catalyst to the olefin-rich feedstock of (1-150):1, preferably (3-150):1, more preferably (4-120):1.

6. The method according to Item 1, wherein the catalytic conversion catalyst comprises, based on the weight of the catalytic conversion catalyst, 1 to 50 wt % of a molecular sieve, 5 to 99 wt % of an inorganic oxide, and 0 to 70 wt % of a clay;

optionally, the molecular sieve comprises 50-100 wt % of a mesoporous molecular sieve and 0-50 wt % of a microporous molecular sieve, based on the total weight of the molecular sieve;

optionally, the mesoporous molecular sieve is a ZSM molecular sieve, and the microporous molecular sieve is a SAPO molecular sieve.

7. The method according to Item 1, wherein the catalytic conversion catalyst further comprises 0.1-3 wt % of a modifying element, based on the weight of the catalytic conversion catalyst; the modifying element is one or more selected from the group consisting of Group VIII metals, Group IVA metals, Group VA metals and rare earth metals.

8. The method according to Item 1, wherein the method further comprises: regenerating the spent catalyst by coke burning to obtain a regenerated catalyst; preheating the regenerated catalyst to 650° C. or higher and then recycling to the catalytic conversion reactor as the catalytic conversion catalyst.

9. The method according to Item 1, wherein the olefin-containing stream obtained from the separation system has an olefin content of 50 wt % or higher.

10. The method according to Item 9, wherein the separation system comprises a product fractionator and an olefin separator, the method comprising:

passing the reaction product vapor into the product fractionator to separate ethylene, propylene, butylene and a first olefin-containing stream;

passing the first olefin-containing stream into the olefin separator, separating a second olefin-containing stream rich in olefins, and recycling the second olefin-containing stream to the bottom of the catalytic conversion reactor for further reaction, wherein the olefin content in the second olefin-containing stream is greater than that in the first olefin-containing stream.

11. A catalytic conversion method for producing ethylene and propylene, the method comprising the steps of:

S1, contacting a hydrocarbon oil feedstock having an olefin content of 50 wt % or higher with a catalytic conversion catalyst having a temperature of 650° C. or higher for catalytic conversion reaction in a catalytic conversion reactor to obtain reaction product vapor and a spent catalyst;

S2, separating the reaction product vapor to obtain ethylene, propylene, butylene and an olefin-rich stream, and respectively introducing the butylene and the olefin-rich stream into the catalytic conversion reactor for further reaction.

12. The method according to Item 11, wherein in step S2, the butylene is contacted with the catalytic conversion catalyst prior to the olefin-rich stream.

13. The method according to Item 11, wherein the olefin content in the olefin-rich stream is 50 wt % or more.

14. The method according to Item 11, wherein the olefins in the olefin-rich stream are C5+ olefins.

15. The method according to Item 11, wherein the method further comprises: regenerating the spent catalyst by coke burning to obtain a regenerated catalyst; and preheating the regenerated catalyst and then recycling to the catalytic conversion reactor.

16. The method according to Item 15, wherein the catalytic conversion catalyst comprises the preheated regenerated catalyst.

17. The method according to Item 11, wherein the catalytic conversion conditions include:

a reaction temperature of 600-800° C., a reaction pressure of 0.05-1 MPa, a reaction time of 0.01-100 seconds, and a weight ratio of the catalytic conversion catalyst to the hydrocarbon oil feedstock of (1-200):1;

preferably, a reaction temperature of 630-780° C., a reaction pressure of 0.1-0.8 MPa, a reaction time of 0.1-80 seconds, and a weight ratio of the catalytic conversion catalyst to the hydrocarbon oil feedstock of (3-180):1;

more preferably, a reaction temperature of 650-750° C., a reaction pressure of 0.2-0.5 MPa, a reaction time of 0.2-70 seconds, and a weight ratio of the catalytic conversion catalyst to the hydrocarbon oil feedstock of (4-150):1.

18. The method according to Item 11, wherein, the reaction conditions for the further reaction of the butylene introduced into the catalytic reactor include: a reaction temperature of 650-800° C., a reaction pressure of 0.05-1 MPa, a reaction time of 0.01-10 seconds, and a weight ratio of the catalytic conversion catalyst to the butylene of (20-200):1;

preferably, a reaction temperature of 680-780° C., a reaction pressure of 0.1-0.8 MPa, a reaction time of 0.05-8 seconds, and a weight ratio of the catalytic conversion catalyst to the butylene of (30-180):1.

19. The method according to Item 11, wherein the hydrocarbon oil feedstock has an olefin content of preferably 80 wt % or more; preferably, the hydrocarbon oil feedstock has an olefin content of 90 wt % or more; more preferably, the hydrocarbon oil feedstock is a pure olefin feedstock.

20. The method according to Item 11 or 19, wherein the olefins in the hydrocarbon oil feedstock are derived from a C4+ fraction generated by dehydrogenation of an alkane feedstock, a C4+ fraction generated by a catalytic cracking unit in an oil refinery, a C4+ fraction generated by a steam cracking unit in an ethylene plant, a C4+ olefin-rich byproduct fraction of an MTO process, and a C4+ olefin-rich byproduct fraction of an MTP process;

the alkane feedstock is at least one selected from the group consisting of naphtha, aromatic raffinate and light hydrocarbons.

21. The method according to Item 11, wherein the catalytic conversion catalyst comprises 1-50 wt % of a molecular sieve, 5-99 wt % of an inorganic oxide, and 0-70 wt % of a clay, based on the weight of the catalytic conversion catalyst;

the molecular sieve is selected from mesoporous molecular sieve and/or microporous molecular sieve;

based on the weight of the catalytic conversion catalyst, the catalytic conversion catalyst further comprises 0.1-3% of a modifying element, and the modifying element is one or more selected from the group consisting of Group VIII metals, Group IVA metals, Group VA metals and rare earth metals.

EXAMPLES

The present application will be described in further detail below with reference to examples. The feedstocks used in the examples are all commercially available.

Feedstocks and Catalyst

The Feedstocks I and II used in the examples below are light catalytic cracking gasoline fractions and the properties of the Feedstocks I and II are shown in Tables 1 and 2, respectively.

TABLE 1

Properties of Feedstock I

| | Content, wt % | | | |
|---|---|---|---|---|
| Carbon atoms | Alkanes | Olefins | Cycloalkanes | Aromatic hydrocarbons |
| 5 | 1.80 | 4.40 | 0.00 | 0.00 |
| 6 | 3.91 | 30.20 | 0.67 | 0.87 |
| 7 | 3.32 | 33.57 | 1.81 | 2.39 |
| 8 | 2.79 | 10.68 | 1.75 | 0.59 |
| 9 | 0.40 | 0.85 | 0.00 | 0.00 |

TABLE 2

Properties of Feedstock II

| Carbon atoms | Content, wt % | | | |
|---|---|---|---|---|
| | Alkanes | Olefins | Cycloalkanes | Aromatic hydrocarbons |
| 5 | 5.10 | 8.75 | 0.45 | 0.00 |
| 6 | 8.76 | 13.75 | 1.97 | 0.00 |
| 7 | 8.42 | 14.4 | 0.52 | 0.94 |
| 8 | 6.40 | 12.34 | 0.18 | 0.27 |
| 9 | 5.94 | 11.77 | 0.00 | 0.04 |

The catalytic conversion catalyst M used in the following examples and comparative examples was prepared by the following method:

(1) NH$_4$Cl (20 g) was dissolved in 1000 g of water, 100 g (dry weight) of a crystallized product ZRP-1 molecular sieve (manufactured by Catalyst plant of Qilu Petrochemical Technology, SiO$_2$/Al$_2$O$_3$=30, rare earth content RE$_2$O$_3$=2.0 wt %), exchanged at 90° C. for 0.5 hour, and filtered to obtain a filter cake; 4.0 g of H$_3$PO$_4$ (with a concentration of 85%) and 4.5 g of Fe(NO$_3$)$_3$ were added and dissolved in 90 g of water, and mixed with the filter cake for impregnation and then dried; then calcined for 2 hours at a temperature of 550° C. to obtain an MFI mesoporous molecular sieve comprising phosphorus and iron. The resulting molecular sieve has the following chemical composition as determined by elemental analysis:

0.1Na$_2$O·5.1Al$_2$O$_3$·2.4P$_2$O$_5$·1.5Fe$_2$O$_3$·3.8RE$_2$O$_3$·88.1SiO$_2$.

(2) 75.4 kg of halloysite (industrial product of Suzhou Porcelain Clay Company, with a solid content of 71.6 wt %) was slurried with 250 kg of decationized water, 54.8 kg of pseudo-boehmite (industrial product of CHALCO Shandong Co., Ltd, with a solid content of 63 wt %) was added thereto, the pH was adjusted to 2-4 with hydrochloric acid, stirred uniformly, allowed to stand at 60-70° C. for aging for 1 hour, kept at the pH of 2-4, cooled to 60° C. or lower, 41.5 kg of alumina sol (product of Catalyst plant of Qilu Petrochemical Technology, with an Al$_2$O$_3$ content of 21.7 wt %) was added thereto, and stirred for 40 minutes to obtain a mixed slurry.

(3) the MFI mesoporous molecular sieve comprising phosphorus and iron (2 kg of dry weight) prepared in the step (1) was added into the mixed slurry obtained in the step (2), uniformly stirred, shaped by spray drying, washed with ammonium dihydrogen phosphate solution (with a phosphorus content of 1 wt %), washed to remove free Na$^+$, and dried to obtain a sample of catalytic conversion catalyst M. Based on the total dry weight of the catalyst M, the composition of the catalyst M on a dry basis includes: 2 wt % of MFI mesoporous molecular sieve comprising phosphorus and iron, 36 wt % of pseudo-boehmite, 8 wt % of alumina sol and the balance of kaolin.

Example 1

An experiment was carried out on a pilot plant of a single fluidized bed reactor according to the scheme shown in FIG. 1 as follows:

1-pentene feedstock was introduced into the bottom of the fluidized bed reactor, preheated catalyst M (720° C.) was introduced into the bottom of the fluidized bed reactor, the 1-pentene feedstock was contacted with the preheated catalyst M (720° C.), and reacted under catalytic reaction conditions including a reaction temperature of 680° C., a reaction pressure of 0.1 MPa, a reaction time of 10 seconds, and a weight ratio of the catalyst M to the 1-pentene feedstock of 30:1;

the reaction product was separated from the carbon-deposited spent catalyst M at the top of the fluidized bed reactor, the spent catalyst was passed to a regenerator for regeneration by coke burning, and the regenerated catalyst was recycled to the fluidized bed reactor after being preheated to 720° C.

the reaction product was split in a product fractionator according to the distillation range to obtain products such as ethylene, propylene, butylene, a stream comprising residual olefins (C5+ olefins), and the like; then the stream comprising residual olefins was passed into an olefin separator, the separated stream having an olefin content of 80 wt % and comprising C5+ olefins was preheated to 680° C., and then introduced into the bottom of the fluidized bed reactor for further reaction. The reaction conditions and product distribution are listed in Table 3.

Comparative Example 1-a

An experiment was carried out as described in Example 1, except that the 1-pentene feedstock was changed to 1-pentane. The product distribution is shown in Table 3.

Comparative Example 1-b 1-pentane feedstock was subjected to thermal cracking reaction on a pilot plant of thermal cracking single-tube reactor under conditions including a reaction temperature of 800° C., a reaction time of 0.2 s, and a weight ratio of steam to feedstock of 0.8, the resulting reaction product was passed into a separation system for separation, to obtain products such as ethylene, propylene, butylene, an olefin-containing stream, and the like. The product distribution is shown in Table 3.

Example 2

An experiment was carried out as described in Example 1, except that the 1-pentene feedstock was changed to a mixture of C5-C8 olefins, and the molar ratio of C5, C6, C7 and C8 olefins in the olefin mixture was 1:1:1:1. The product distribution is shown in Table 3.

Comparative Example 2

An experiment was carried out as described in Example 1, except that the 1-pentene feedstock was changed to a mixture of C5-C8 alkanes, and the molar ratio of C5, C6, C7 and C8 alkanes in the alkane mixture was 1:1:1:1. The product distribution is shown in Table 3.

Example 3

An experiment was carried out as described in Example 1, except that the 1-pentene feedstock was changed to the Feedstock I. The product distribution is shown in Table 3.

Example 4

An experiment was carried out as described in Example 1, except that the 1-pentene feedstock was changed to the Feedstock II. The product distribution is shown in Table 3.

Example 5

An experiment was carried out as described in Example 1, except that the temperature of the regenerated catalyst was raised to 800° C. and the reaction temperature was raised to 750° C. The product distribution is shown in Table 3.

Example 6

An experiment was carried out as described in Example 1, except that the temperature of the regenerated catalyst was lowered to 650° C. and the reaction temperature was lowered to 600° C. The product distribution is shown in Table 3.

Comparative Example 3

An experiment was carried out as described in Example 1, except that the temperature of the regenerated catalyst was lowered to 600° C. and the reaction temperature was lowered to 530° C. The product distribution is shown in Table 3.

Example 7

An experiment was carried out on a pilot plant of a riser reactor according to the scheme shown in FIG. 2 as follows:

1-pentene feedstock was fed to the bottom of the riser reactor, and contacted with a catalytic conversion catalyst M preheated to 750° C., to conduct a catalytic conversion reaction under conditions including a temperature of 700° C., a reaction pressure of 0.1 MPa, a reaction time of 5 s and a weight ratio of the catalytic conversion catalyst to the feedstock of 30:1.

The reaction product vapor was separated from the carbon-deposited spent catalyst, and the reaction product vapor was split in a product fractionator according to the distillation range to obtain products such as ethylene, propylene, butylene, a stream comprising residual olefins (with a distillation range of 20-250° C.) and the like. The stream comprising the residual olefins was further separated in an olefin separator to obtain a stream comprising C5+ olefins and having an olefin content of 80 wt %.

The product butylene was fed into the bottom of the riser reactor for cracking under conditions including a reaction temperature of 740° C., a weight ratio of the catalytic conversion catalyst to the butylene of 100:1, and a reaction time of 0.2 s. The stream comprising C5+ olefins was fed into the bottom of the riser reactor together with the 1-pentene feedstock downstream of the feeding position of butylene for further cracking under a reaction temperature of 700° C. for a reaction time of 5 s. The product distribution is shown in Table 3.

Example 8

An experiment was carried out on a pilot plant of a riser reactor according to the scheme shown in FIG. 3, the operation and reaction conditions were as described in Example 7, except that methanol was introduced into the middle of the riser reactor to carry out the reaction under conditions including a reaction temperature of 500° C., a reaction time of 3 s and a weight ratio of catalytic conversion catalyst to methanol of 35:1; the product butylene was fed into the bottom of the riser reactor for cracking under conditions including a reaction temperature of 740° C., a weight ratio of the catalytic conversion catalyst to the butylene of 100:1 and a reaction time of 0.2 s. The product distribution is shown in Table 3.

TABLE 3

Reaction conditions and product distribution for each example and comparative example

| | Ex. 1 | Comp. Ex. 1-a | Comp. Ex. 1 b | Ex. 2 | Comp. Ex. 2 | Ex. 3 | Ex. 4 | Ex. 5 | Ex. 6 | Comp. Ex. 3 | Ex. 7 | Ex. 8 |
|---|---|---|---|---|---|---|---|---|---|---|---|---|
| Feedstock | 1-pentene | 1-pentane | 1-pentane | Mixture of C5-C8 olefins | Mixture of C5-C8 alkanes | Olefin-rich gasoline (Feedstock I) | Olefin-rich gasoline (Feedstock II) | 1-pentene | 1-pentene | 1-pentene | 1-pentene | 1-pentene |
| Olefin content of the feedstock, wt % | 100 | 0 | 0 | 100 | 0 | 79 | 61 | 100 | 100 | 100 | 100 | 100 |
| Catalyst temperature, ° C. | 720 | 720 | — | 720 | 720 | 720 | 720 | 800 | 650 | 600 | 750 | 750 |
| Reaction temperature, ° C. | 680 | 680 | 800 | 680 | 680 | 680 | 680 | 750 | 600 | 530 | 700 | 700 |
| Catalyst-to-oil ratio | 30 | 30 | / | 30 | 30 | 30 | 30 | 30 | 30 | 30 | 30 | 30 |
| Reaction time, s | 10 | 10 | 0.2 | 10 | 10 | 10 | 10 | 10 | 10 | 10 | 5 | 5 |
| Olefin content at the outlet of the olefin separator, wt % | 80 | 80 | / | 80 | 80 | 80 | 80 | 80 | 80 | 80 | 80 | 80 |
| Yield wt % | | | | | | | | | | | | |
| Hydrogen + methane + ethane | 8.61 | 7.57 | 23.53 | 8.17 | 7.68 | 7.52 | 7.16 | 11.38 | 6.83 | 5.49 | 9.53 | 8.23 |
| Ethylene | 23.30 | 3.15 | 41.61 | 19.78 | 7.02 | 20.69 | 14.07 | 27.13 | 9.52 | 4.54 | 34.33 | 38.28 |
| Propylene | 34.22 | 6.34 | 17.06 | 33.97 | 11.81 | 30.08 | 27.11 | 31.57 | 20.04 | 17.92 | 39.12 | 37.44 |
| Butylene | 17.44 | 6.21 | 2.10 | 20.46 | 13.25 | 13.87 | 10.23 | 11.09 | 14.39 | 16.47 | — | — |
| Propane + butane | 2.15 | 1.06 | 0.53 | 2.55 | 4.02 | 3.06 | 3.19 | 1.24 | 2.21 | 2.04 | 1.02 | 1.94 |

TABLE 3-continued

Reaction conditions and product distribution for each example and comparative example

|  | Ex. 1 | Comp. Ex. 1-a | Comp. Ex. 1 b | Ex. 2 | Comp. Ex. 2 | Ex. 3 | Ex. 4 | Ex. 5 | Ex. 6 | Comp. Ex. 3 | Ex. 7 | Ex. 8 |
|---|---|---|---|---|---|---|---|---|---|---|---|---|
| Benzene (III) | 0.83 | 0.02 | 2.71 | 0.61 | 0.01 | 0.89 | 0.94 | 3.03 | 1.03 | 0.28 | 3.03 | 4.66 |
| Toluene | 4.48 | 0.05 | 0.75 | 1.94 | 0.13 | 3.99 | 2.11 | 5.91 | 1.36 | 1.79 | 5.91 | 4.15 |
| Xylene | 3.19 | 0.03 | 0.12 | 0.37 | 0.22 | 1.57 | 1.64 | 2.53 | 0.81 | 2.35 | 2.53 | 2.40 |
| Light oil | 5.26 | 75.38 | 10.05 | 11.76 | 55.64 | 17.93 | 33.21 | 5.08 | 43.51 | 48.85 | 3.95 | 2.41 |
| Coke | 0.52 | 0.19 | 1.54 | 0.39 | 0.22 | 0.40 | 0.34 | 1.04 | 0.30 | 0.27 | 0.58 | 0.49 |
| Total | 100.00 | 100.00 | 100.00 | 100.00 | 100.00 | 100.00 | 100.00 | 100.00 | 100.00 | 100.00 | 100.00 | 100.00 |
| Ethylene + propylene + butylene | 74.96 | 15.70 | 60.77 | 74.21 | 32.08 | 64.64 | 51.41 | 69.79 | 43.95 | 38.93 | 73.45 | 76.23 |

As can be seen from Table 3, the cracking of olefin-containing feedstocks at high temperature in Examples 1-4 provides higher yields of ethylene, propylene and butylene, and the higher the olefin content of the feedstock the higher the yield. For example, in Example 1, when 1-pentene with an olefin content of 100% was used as the feedstock, the ethylene content in the product was 23.30%, the propylene content was 34.22%, and the butylene content was 17.44%, the total content of the three was 74.96%. Example 7 employed a higher reaction temperature and recycling of butylene, which provided an ethylene yield of 34.33%, a propylene yield of 39.12%, and a yield of the two olefins of 73.45%. When the reaction temperature was lowered to 600° C. or below, as in Comparative Example 3, both the yields of ethylene and propylene dropped significantly. When the oxygen-containing organic compound feed was increased, as in Example 8, the yield of the two olefins (ethylene and propylene) was increased by 2.78 percentage points over Example 7. In addition, the yield of benzene, toluene, xylene of the olefin cracking in each example of the present application was also significantly increased as compared to the alkane cracking of Comparative Examples 1-a and 2.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A fluidized catalytic conversion method for producing light olefins, comprising the steps of:
   1) Introducing an olefin-rich feedstock through a first inlet into a fluidized catalytic conversion reactor, contacting with a catalytic conversion catalyst, and reacting under first catalytic conversion conditions, wherein the olefin-rich feedstock has an olefin content of 50 wt % or more and the catalyst conversion catalyst is pre-heated to a temperature of 650° C. or higher;
   2) Separating the effluent of the fluidized catalytic conversion reactor to obtain a reaction product vapor and a spent catalyst, and separating the reaction product vapor to obtain ethylene, propylene, butylene and a stream comprising C5+ olefins; and
   3) feeding at least a part of the stream comprising C5+ olefins obtained from step 2) to the fluidized catalytic conversion reactor through a second inlet located downstream from the first inlet for further reaction, wherein the first catalytic conversion conditions include:
      a reaction temperature of 600-800° C.;
      a reaction pressure of 0.05-1 MPa;
      a reaction time of 0.01 to 100 seconds; and
      a weight ratio of the catalytic conversion catalyst to the olefin-rich feedstock of (1-200):1;
   and
   4) feeding at least a part of the butylene obtained from step 2) to the fluidized catalytic conversion reactor at a third inlet located downstream from the first inlet for further reaction under second catalytic conversion conditions,
      wherein the second catalytic conversion conversions include:
      a reaction temperature of 650-800° C.;
      a reaction pressure of 0.05-1 MPa;
      a reaction time of 0.01 to 10 seconds; and
      a weight ratio of the catalytic conversion catalyst to the butylene of (20-200):1.

2. The method according to claim 1, wherein the olefin-rich feedstock has an olefin content of 80 wt % or more.

3. The method according to claim 1, wherein the olefins in the olefin-rich feedstock consist essentially of C5+ olefins.

4. The method according to claim 1, further comprising the steps of:
   1a) introducing an oxygen-containing organic compound into the fluidized catalytic conversion reactor downstream from the first inlet for further reaction under third catalytic conversion conditions, which includes:
      a reaction temperature of 300-550° C.;
      a reaction pressure of 0.01 to 1 MPa;
      a reaction time of 0.01 to 100 seconds; and
      a weight ratio of the catalytic conversion catalyst to the oxygen-containing organic compound feedstock of (1-100):1.

5. The method according to claim 1, wherein the catalytic conversion catalyst comprises 1-50 wt % of a molecular sieve, 5-99 wt % of an inorganic oxide, and 0-70 wt % of a clay, based on the weight of the catalytic conversion catalyst.

6. The method according to claim 1, wherein the catalytic conversion catalyst comprises 0.1-3 wt % of a modifying element, based on the weight of the catalytic conversion catalyst; and the modifying element is one or more selected from the group consisting of Group VIII metals, Group IVA metals, Group VA metals, and rare earth metals.

7. The method according to claim 1, wherein the fluidized catalytic conversion reactor is selected from the group consisting of a riser reactor, a constant-linear-velocity fluidized bed, an equal-diameter fluidized bed, an ascending transfer line, a descending transfer line, and a combination of two reactors thereof connected in series, and wherein the riser reactor is an equal-diameter riser reactor or a diameter-transformed fluidized bed reactor.

8. The method according to claim 1, further comprising the steps of:
   5) Regenerating the spent catalyst obtained by the separation in step 2) by coke burning to obtain a regenerated catalyst, having a temperature of 650° C. or higher, and then recycling the regenerated catalyst to the fluidized catalytic conversion reactor for use as the catalytic conversion catalyst.

9. The method according to claim 1, wherein the stream comprising C5+ olefins has a C5+ olefin content of 50 wt % or more.

10. The method according to claim 1, wherein the step 2) comprises:
   2a) separating the effluent of the fluidized catalytic conversion reactor to obtain reaction product vapor and the spent catalyst;
   2b) separating the reaction product vapor in a product fractionator to obtain ethylene, propylene, butylene and a first olefin-containing stream; and
   2c) separating the first olefin-containing stream in an olefin separator to obtain the stream comprising C5+ olefins, wherein the olefin content in the stream comprising C5+ olefins is greater than the olefin content in the first olefin-containing stream.

11. The method according to claim 1, wherein the first catalytic conversion conditions include:
   a reaction temperature of 630-780° C.;
   a reaction pressure of 0.1-0.8 MPa;
   a reaction time of 0.1 to 80 seconds; and
   a weight ratio of the catalytic conversion catalyst to the olefin-rich feedstock of (3-180):1.

12. The method according to claim 1, wherein the olefin-rich feedstock has an olefin content of 90 wt % or more.

13. The method according to claim 1, wherein the olefin-rich feedstock is a pure olefin feedstock.

14. The method according to claim 3, wherein the olefin-rich feedstock is one or more of a C5+ fraction produced by an alkane dehydrogenation unit, a C5+ fraction produced by a catalytic cracking unit of an oil refinery, a C5+ fraction produced by a steam cracking unit of an ethylene plant, a C5+ olefin-rich byproduct fraction of an MTO process, and a C5+ olefin-rich byproduct fraction of an MTP process.

15. The method according to claim 1, wherein the second catalytic conversion conditions include:
   a reaction temperature of 680-780° C.;
   a reaction pressure of 0.1-0.8 MPa;
   a reaction time of 0.05 to 8 seconds; and
   a weight ratio of the catalytic conversion catalyst to the butylene of (30-180):1.

16. The method according to claim 4, wherein the third catalytic conversion conditions include:
   a reaction temperature of 400-530° C.;
   a reaction pressure of 0.05 to 1 MPa;
   a reaction time of 0.1 to 80 seconds; and
   a weight ratio of the catalytic conversion catalyst to the oxygen-containing organic compound feedstock of (3-50):1.

17. The method according to claim 4, wherein the oxygen-containing organic compound comprises at least one selected from the group consisting of methanol, ethanol, dimethyl ether, methyl ethyl ether, and ethyl ether.

18. The method according to claim 5, wherein the molecular sieve comprises 50-100 wt % of a mesoporous molecular sieve and 0-50 wt % of a microporous molecular sieve, based on the total weight of the molecular sieve.

19. The method according to claim 18, wherein the mesoporous molecular sieve is a ZSM molecular sieve, and the microporous molecular sieve is a SAPO molecular sieve.

* * * * *